United States Patent [19]

Hing

[11] 4,155,757
[45] May 22, 1979

[54] ELECTRIC LAMPS AND COMPONENTS AND MATERIALS THEREFOR

[75] Inventor: Peter Hing, London, England

[73] Assignee: Thorn Electrical Industries Limited, London, England

[21] Appl. No.: 748,704

[22] Filed: Dec. 8, 1976

[30] Foreign Application Priority Data

Mar. 9, 1976 [GB] United Kingdom ................ 9359/76

[51] Int. Cl.² .............................................. B22F 3/00
[52] U.S. Cl. ........................................ 75/232; 75/206; 75/212; 425/570; 252/518
[58] Field of Search ................ 75/232, 206, 212, 929; 252/518.1; 428/570

[56] References Cited

U.S. PATENT DOCUMENTS

| | | | |
|---|---|---|---|
| 3,519,405 | 7/1970 | Gordon | 75/212 |
| 3,650,991 | 3/1972 | Watson | 252/518.1 |
| 3,708,387 | 1/1973 | Turner et al. | 75/212 |
| 3,712,809 | 1/1973 | Bumm et al. | 75/212 |
| 3,787,229 | 1/1974 | Rudness | 75/232 |
| 3,885,184 | 5/1975 | Schat et al. | 313/221 |
| 4,001,625 | 1/1977 | Schat et al. | 313/221 |

*Primary Examiner*—Brooks H. Hunt
*Attorney, Agent, or Firm*—Robert F. O'Connell

[57] ABSTRACT

Conducting cermets with volume fractions of nickel down to 0.045 are produced by coating relatively coarse refractory oxide granules with fine metal powder particles are compacting and sintering the coated granules. Using oxide granules in the size range 400 to 800 microns it is possible to make conducting cermets having the same volume fraction of metal and thus the same thermal expansion coefficients as insulating cermets prepared from finer granules of the same oxide. The cermets can be used to fabricate tubes and components for electric lamps and may include integrally formed conducting and insulating regions.

12 Claims, 23 Drawing Figures

ELECTRIC LAMPS AND COMPONENTS AND MATERIALS THEREFOR

The present invention relates to cermets, their production and their use in the fabrication of arc and other lamp tubes, components and end closures for electric lamps and discharge devices.

One of the major limitations of refractory oxide ceramics is their lack of ductility. This imposes severe limitations on the design of structural components. Even at temperatures exceeding half the melting point, the number of independent slip systems operative are insufficient to satisfy the minimum of five independent slip systems for ductility. Although the strength of the ceramic materials can be markedly improved by reducing the grain size and level of porosity with an appropriate additive, catastrophic failure usually occurs once the fracture stress is exceeded. One way of improving resistance to crack initiation and crack propagation is to increase the fracture surface energies by at least an order of magnitude. Such an increase in toughness can be achieved by the incorporation of one or more ductile phase in the ceramic matrix, but the amount and geometrical disposition of the second phase profoundly affect the strengthening and toughening of the brittle matrix composites.

A cermet may be defined as a ceramic material containing a proportion of metal as a separate phase. One example of a cermet, for instance, could be an $Al_2O_3$ ceramic containing, say, Mo, W or Fe. Such materials may either be insulators or electrical conductors, depending upon the relative proportions of the oxide and the metal or metals, and upon the particle size and distribution of the metal in the sintered material. The inclusion of a ductile metal phase results in an increase in mechanical strength, toughness and thermal shock resistance over the conventional ceramic material.

Recently, British Patent specification No. 1,382,934 has described how an alumina-molybdenum cermet with a volume fraction of 0.34 molybdenum may be used to close the end of an alumina ceramic arc tube in making a high pressure sodium lamp, and another British specification No. 1,361,773 describes the use of an electrically conducting alumina-molybdenum cermet with a volume fraction of 0.20 molybdenum for a similar purpose. In this latter specification the cermet cap forming the closure both carries the electrode and acts as an electrical contact to the lamp. The principal advantage of this system is that the electrode does not pass through the cermet cap, as in the case of other end seals, and this avoids the difficulty of making a hermetic seal between electrode and cap. The disadvantage of this system is that the mismatch in expansion of the cermet and alumina arc tube produces a strain in the seal, over its working range of temperature (typically from ambient to 900° C.), which can cause the cap or tube to crack and leak. It is believed that until recent times most conducting cermets have had to contain a relatively large quantity of metal (usually a volume fraction of at least 0.2) to render them electrically conducting. (Throughout this specification the term "volume fraction" means the ratio of the volume of metal to the volume of ceramic, both reckoned at their full theoretical densities as separate materials). This quantity of metal in the cermet significantly affects its thermal expansion characteristics and gives rise to the expansion mismatch referred to.

Up to the present time the sealing of tubes of essentially monocrystalline corundum (available under the Trade Mark "Corstar"—Corning) with ceramic caps has presented some technical problems. For instance, it is found that as the bore of the "Corstar" tube increases, the tendency for end cracking also increases during the sealing operation. This is caused partly by the mismatch in the coefficients of thermal expansion of the "Corstar" along the a and c axis and the sintered polycrystalline alumina, and partly by the fact that "Corstar" is more prone to catastrophic failure than polycrystalline alumina. The tendency of "Corstar" to crack is generally attributed to the fact that the material is not a true single crystal, but contains several grain boundaries which weaken the material.

In accordance with this invention, ways have now been discovered of overcoming these problems, using novel cermet materials and employing novel methods of closing the ceramic envelope or of lamp or cap fabrication. These discoveries are equally applicable to "Corstar" and polycrystalline ceramic arc tubes.

In accordance with a first aspect of the invention there is now provided an electrically conducting cermet comprising refractory oxide granules, for example alumina, surrounded by a thin layer of a metal selected from a B group of Group 4B to 7B or Group 8, for example tungsten or molybdenum, which constitutes a conducting network extending through the cermet. This enables an electrically conducting cermet to be prepared containing a low volume fraction of metal and hence having a coefficient of thermal expansion closely matching that of a refractory oxide ceramic, e.g. polycrystalline alumina.

The new cermets can be made by rolling together a finely divided powder of the metal and much coarser granules or agglomerates of the oxide until the latter are uniformly coated with the metal powder, whereafter the coated granules are compacted to form a coherent body and subsequently sintered. The actual dimensions of the particles are not critical, except in the production of more specialized cermets discussed below, but the metal particles must be sufficiently finer than the oxide granules for the latter to acquire a coating of the former in the rolling operation.

The fabrication of an electrically conducting oxide-metal cermet with a very low metal content is not confined to tungsten or molybdenum, as mentioned above. Examples of other metals from the Groups specified include chromium, iron and nickel, which are also easily incorporated in the cermet, either in addition to or instead of tungsten or molybdenum. The cermet can be sintered or hot pressed in a vacuum or in another neutral environment such as argon or hydrogen.

The refractory oxide in the cermet can also be of a wide variety of chemical compositions, for example oxides of Al, Mg, Be Y, Hf, Zr, Th. This may be mixtures of oxides e.g. spinels, or contain other oxides as impurities, e.g. Mg Y or La oxides in $Al_2O_3$, or as additives to assist sintering, e.g. additions of MgO, $Y_2O_3$ or $Yb_2O_3$.

The technique provided by the present invention for closing "Corstar" and polycrystalline alumina arc tubes is also applicable for closing other ceramic oxide tubes.

Further in accordance with this aspect of the invention, it has been found that, using refractory oxide granules of mean particle size in the range 400 to 800 microns diameter and particles of metal powder below micron mean diameter, cermets of desired insulating or conducting properties can be prepared by selecting the volume fraction and/or the size of oxide granules. In particular, at volume fractions of tungsten in the range of 0.045 to 0.067 conducting cermets can be made using oxide granules in the range 400–800 microns and insulating cermets using smaller oxide granules both cermets having an identical volume fraction of metal and thus similar thermal expansion coefficients, which are in turn very close to that of a pure oxide ceramic.

In understanding the statements of mean particle size of granules and powder employed in making cermets according to this invention, it must be noted that there are difficulties in achieving a wholly accurate determination of particle size in the ranges covered by this invention and the limiting or preferred values should be interpreted or applied accordingly.

In accordance with a second aspect of this invention, it has been found that electric lamp or discharge tubes or components thereof can advantageously be formed of composite structures comprising a cermet portion, for example of alumina/tungsten conducting cermet, and a ceramic portion, for example of sintered alumina ceramic. These composite tubes or components can be prepared as integral or monolithic structures by compressing together layers of the constituent materials for the different portions and sintering the resulting composite green compact.

Further in accordance with this aspect of the invention a cap for closing the end of ceramic arc tubes or incandescent lamp envelopes is formed at least in part of a conducting cermet and provided with an annular groove to accommodate the end of the wall of the envelope. The cap may be sealed over the wall end with the help of a glass frit, for example a conventional magnesium aluminate frit. This means of closure of a ceramic arc tube is particularly suitable for the construction of high pressure sodium and metal halide lamps. The present invention also provides a method of fabricating and using a composite cap of insulating and conducting cermets with the same volume fraction of metal and virtually no difference in the coefficients of thermal expansion. Such composite caps can be formed with two or more conducting regions separated by an insulating region and can thus be used to close an envelope or bulb having a single open end. They are also preferably formed with an annular groove to accommodate the envelope wall.

In the accompanying drawings, which are given by way of example only:

FIGS. 10 and 11 show ceramic envelopes positioned in two examples of grooved conducting cermet caps;

CONDUCTING CERMET MATERIAL

In general, the cermets of this invention can be formed from refractory oxide granules of mean diameter in the range 50 to 800 microns and particles of Group 4B to 7B or 8 metals of mean diameter less than 12 microns.

In general, the finer the metal particles the better, and they are preferably not greater than 1 micron mean diameter. Particles of up to 12 microns are best suited to the coarsest oxide.

Where the volume of fraction of metal is at least 0.067, and more especially between this value and 0.2, conducting cermets can be formed with oxide granules over the whole range of mean particle size from 5 to 800 microns, but more especially between 50 and 200 microns. Cermets made from oxide granules in this range give conductive cermets at volume fractions of metal above 0.067, but not at lower volume fractions.

Oxide granules of larger mean particle size, in the range 400 to 800 microns enable conducting cermets to be obtained at volume fractions down to 0.045, but because insulating cermets are obtained at these low volume fractions when smaller oxide granules are employed, preferably below 100 microns, and especially below 50 microns, it becomes possible to produce a conducting and insulating cermet with identical volume fractions of metal, and thus with similar properties such as thermal conductivity, merely by appropriate selection of the particle size of the oxide.

With the latter type of cermet it is desirable that the oxide granules should be confined to a relatively narrow range of particle sizes, for example ±50 microns on either side of the mean in the case of the granules in the 400–800 micron range. When preparing conducting cermets of volume fraction above 0.067, notably from oxide granules in the range 5 to 200 microns, a narrow distribution is not important.

Free flowing alumina granules, suitable for metallizing as described, can be obtained by wet milling one kilogram of 99.98% purity $\alpha$ or $\gamma$ alumina powder, or a mixture of $\alpha$ and $\gamma$, with an average particle size of 0.3 $\mu$m and a surface area of 30 $m^2g^{-1}$ for 6 hours with 2 liters of deionized water together with 0.05% by weight free magnesia (to promote densification and uniform grain growth). The slurry is subsequently dried, sieved through a 710 micron mesh and freely rolled to agglomerate most of the fine particles below 50 micron in diameter. The granulated material is subsequently sieved through various mesh sizes to give a final size within a specified range of diameters. Rare earth oxides, such as yttria or ytterbia, in quantities up to 0.1% by weight can be added in addition to magnesia to lower the sintering temperature. The size of the granules can be controlled by the duration of the rolling operation, the size increasing with increased rolling time. For example, particles of 200μ can be prepared by 20 minutes rolling but where necessary, rolling can be much more prolonged, e.g. in excess of 1 hour.

In order to redistribute the stresses uniformly in alumina granules, it has been found desirable to add magnesia during processing of the alumina powder. The addition of magnesia inhibits grain growth and promotes densification of the alumina to >99.95% of theoretical density on sintering and, moreover, a uniform grain size is achieved. In the above example an addition of 0.05 weight % free magnesia is preferred. By adding higher amounts of magnesia, up to 0.25 weight %, the grain size of the sintered alumina can be further reduced, thus leading to an increase in strength of the cermet. The preferred useful range is from 0.01 to 0.25 weight % MgO.

One example of a material suitable for closing alumina arc tubes is a cermet formed of $Al_2O_3$ and W, where the volume fraction of W is 0.072. This material has a resistivity of about $5 \times 10^{-3}$ ohm.cm. and a thermal expansion coefficient only $5 \times 10^{-7}$ $C.^{-1}$ below that of polycrystalline alumina (in the range 100° C.-900° C.).

An alumina/tungsten electrically conducting cermet of this kind can be made by mixing 28.5% by weight of tungsten powder of 99.95% purity and a mean particle size of 1 μm, preferably approximately spherical in shape, with alumina granules of about 200 μm in diameter. The mixture is then rolled freely for 20 minutes to achieve a uniform coating of the tungsten powder on the granules.

We have produced materials of this type, having satisfactory conductivity in the sintered condition with volume fractions of metal varying from 0.067 to 0.2, but higher volume fractions are possible.

Using an oxide granule size between 400 and 800 microns diameter, an electrically conducting cermet with a volume fraction of metal as low as 0.045 can be achieved. An alumina-tungsten cermet of this type has a thermal expansion coefficient only $2 \times 10^{-7}$ $C.^{-1}$ below that of polycrystalline alumina in the temperature range 100°-900° C. and a resistivity of about 6 ohm-cm.

One method of producing an electrically conducting alumina-tungsten cermet with a very low volume content of tungsten consists in mixing tungsten powder of 99.95% purity with a mean particle size of 1 μm, preferably spherical in shape, with carefully sized alumina granules of about 500 μm in diameter. Submicron metal particles are preferably used for more efficient metallization of the ceramic granules. Care should be taken to exclude the fine alumina particles to give the maximum utilization of the metallic powders. It is also found beneficial to break the lumps of tungsten so as to avoid segregation of islands of tungsten. The mixture is then rolled freely for about 60 minutes to achieve a uniform coating of the tungsten powder on the granules. The metallized alumina granules are approximately spherical in shape and have extremely good flow properties. The rolled oxide/metal granules used in the production of the cermets of this invention can be shaped by uniaxial compaction, preferably in a stainless steel die at a pressure around 11,000 psi. To avoid debonding of the metal on the granules, the metallized particles may be poured through a funnel into the die. Uniaxial compaction, however, tends to squash the coated alumina granules and result in an ellipsoidal network structure. An alternative forming method is isostatic compaction of a rod in the pressure range 10,000-20,000 psi. This method gives a more uniform structure and consequently reduces anisotropy in the physical properties. The as-pressed rods moreover possess high "green" strength and can be machined, using diamond impregnated tools, to a good surface finish without the prefiring that is normally required with single phase alumina.

The shaped material can be sintered at 1600°-1800° C. for 2-6 hours. The high resistance to thermal shock of the sintered cermet is demonstrated by the fact that a large piece of the material can be removed from the furnace above 1400° C. without cracking whereas a similar piece of high density alumina would inevitably crack in similar circumstances. In this respect the three dimensional metallic mesh structure of the conducting materials of this invention confers higher mechanical strength and toughness of the cermet to a much greater degree than would be expected from the volume content of the metal in the brittle ceramic matrix.

Figure 1:
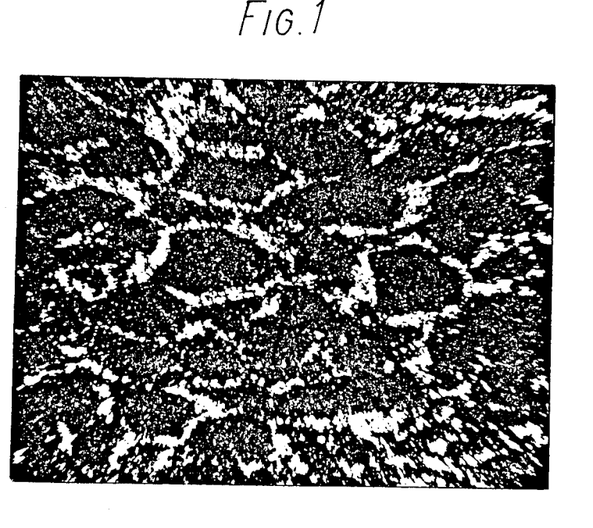
FIG. 1 is a photomicrograph ($\times 60$) of a conductive alumina/tungsten cermet according to the invention.
Figure 2:
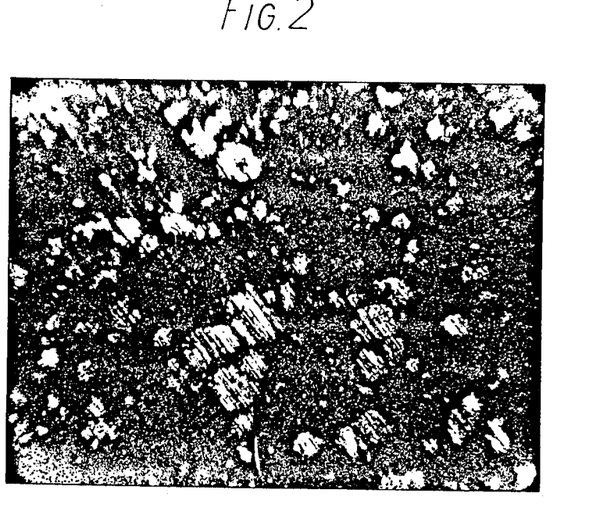
FIG. 2 is a similar photomicrograph of a conventional non-conducting cermet.
Figure 3:
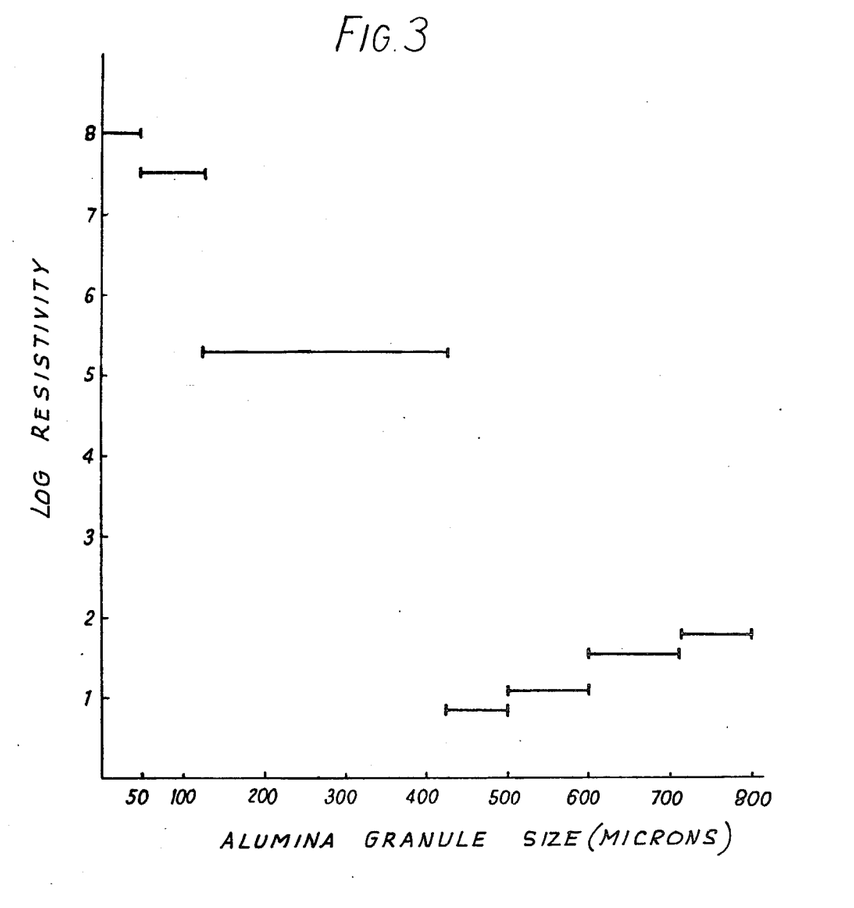
FIG. 3 is a diagram showing the variation of resistivity of sintered alumina-tungsten cermet of 0.049 volume fraction of tungsten with the alumina granule size.
Figure 4:
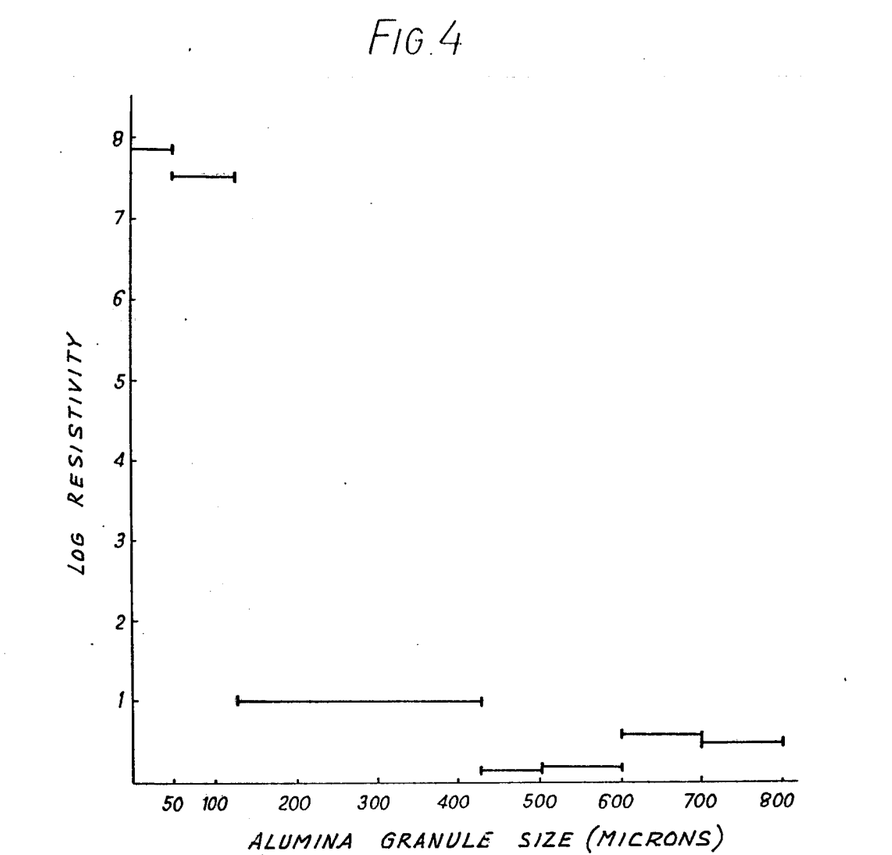
FIG. 4 is a diagram showing the variation of resistivity of sintered alumina-tungsten cermet of 0.064 volume fraction of tungsten with the alumina granule size.

FIG. 1 shows the conducting network structure of tungsten in an alumina/tungsten cermet containing a volume fraction of 0.07 tungsten. In contrast FIG. 2 shows a nonconducting cermet having a volume fraction of 0.16 tungsten. The tungsten powder, because of its particular particle size and shape, does not metallize the alumina granules in this latter case and does not provide a conductive network. It is found that the resistivity of the sintered cermets exhibits a minimum when the granule size lies in the range of 400-600 microns diameter as shown in FIGS. 3 and 4 for both 0.049 and 0.064 volume fractions of tungsten. The results depicted in FIG. 3 and FIG. 4 show that cermet materials, ranging from an insulator to a conductor, can be obtained with virtually no difference in the coefficients of thermal expansion, the resistivity being mainly governed by the initial size of the alumina granules. This property can be exploited in accordance with this invention in the construction of a composite cermet cap for the closure of arc tubes.

CERMET CAPS FOR DISCHARGE LAMPS

One application of the materials of this invention is in the manufacture of conducting cermet end caps for high pressure sodium and other discharge lamps.

Figure 5:
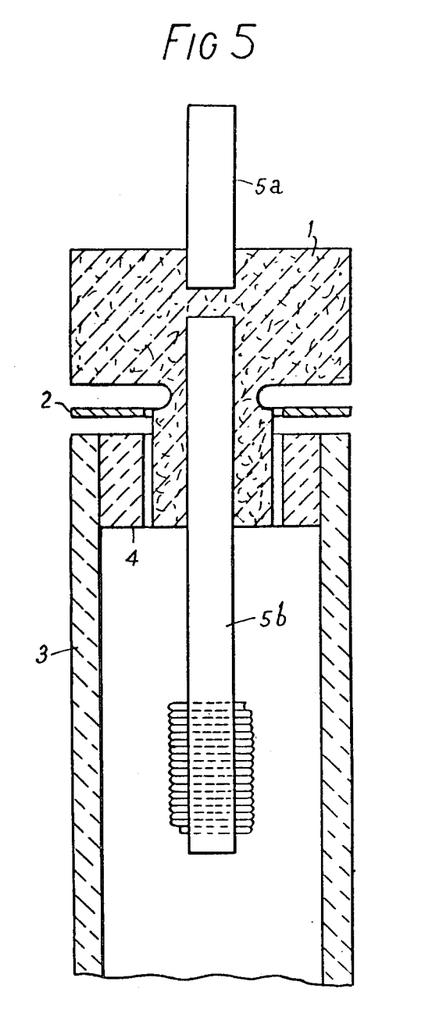
FIGS. 5 to 8 are fragmentary sectional views showing the construction and use of arc tube end caps in accordance with the invention.

In one example of such manufacture, as shown in FIG. 5, a pressed rod of the cermet of this invention is machined into a "top hat" configuration constituting the cap 1. Holes are drilled part way through the cap from top and bottom, and tungsten rods or wires 5a and 5b which are a good fit in the holes are positioned in them and sintered at 1800° C. for 2 hours in a hydrogen environment. On being sintered the cement undergoes a linear shirnkage of approximately 26% and thus forms an extremely strong mechanical bond with the tungsten rods. The assembly can be removed from the furnace at about 1400° C. into an inert or reducing atmosphere without cracking. The outer rod 5a is used as an external electrical contact and the other rod 5b, which is fitted with an overwind, as the lamp cathode. The conducting nature of the cermet cap 1 maintains electrical continuity between the rods 5a and 5b.

Figure 6:
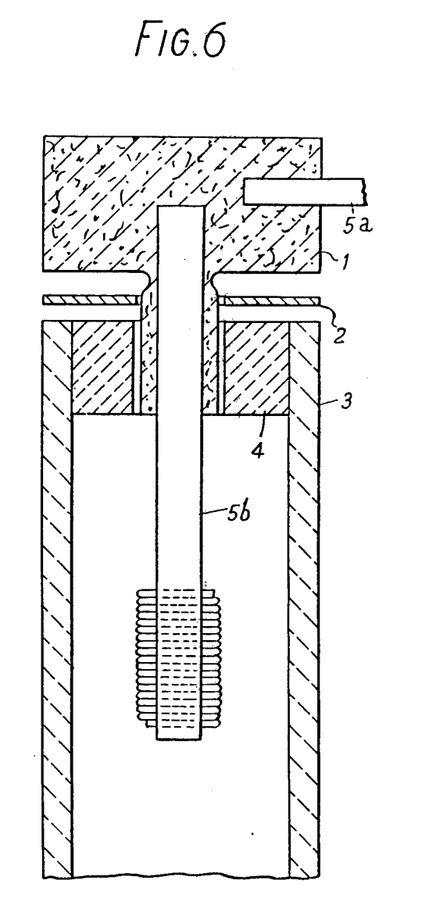

The electrical contact for the elecrode can be arranged in a variety of ways. For instance, as shown in FIG. 6, the rod 5a can be inserted in the side of the upper part of the cermet cap 1. Electrical contact to the rod 5a can be made by welding, brazing or mechanically gripping the rod. Alternatively, the rod 5a can be omitted and contact made by brazing, for example, a nickel rod or strip on to the surface of the cap with a high temperature braze such as a titanium-vanadium-zirconium ternary alloy.

Figure 7:
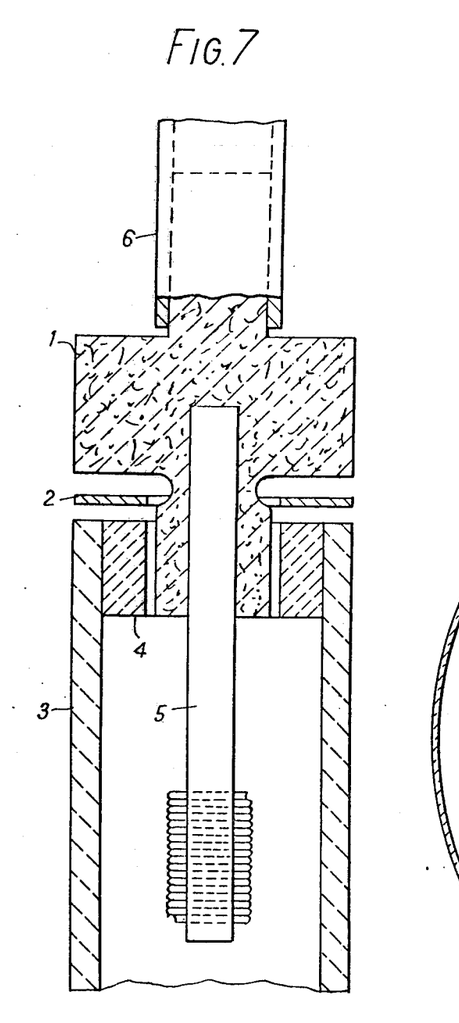
Figure 8:
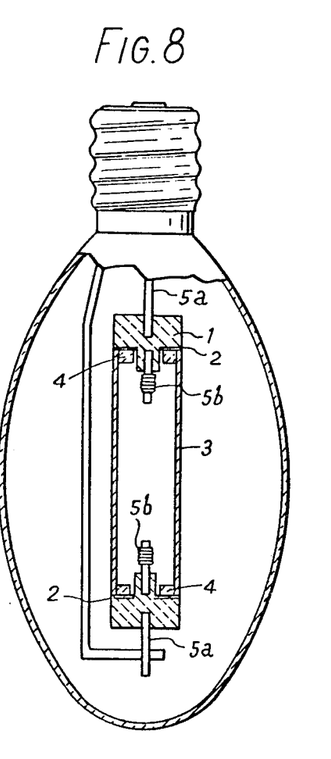

A further alternative is shown in FIG. 7 which consists in sliding a circular metal compression clip 6 onto a protruding, conducting cermet rod element which is an integral part of the cap configuration. The use of a compression clip has the advantage that it can be easily welded or brazed, in an oxidizing environment, to other metallic components used within the lamp. It can accommodate dimensional changes occurring during operation of the lamp and also can be used as a rigid support in certain constructions.

In fabricating a lamp in accordance with any of these examples the sintered cermet cap complete with electrode and electrical contact is then joined to a translucent polycrystalline alumina tube 3 by placing a ring 2 of a suitable sealing material, for example calcium magnesium aluminate frit, between the cap 1 and a monolithic plug 4. The assembly is placed in a chamber with facilities for dosing and gas filling the arc tube and is heated in an inert gas atmosphere to a temperature above the softening point of the glass frit (about 1400° C.) for hermetic sealing of the tube. FIG. 6 shows a 400-watt high pressure sodium lamp with outer jacket which makes use of the kind of conducting end closure shown in FIG. 3. Because of the favourable chemical compatibility of the alumina/tungsten end cap, this type of construction is also suitable for other kinds of discharge lamp, for example discharge lamps containing metal halides.

This invention additionally provides an electrically conducting cermet cap with a circular groove which can be used for closing a ceramic envelope made more especially from "Corstar" or polycrystalline alumina. The closure of "Corstar" arc tubes in the construction of discharge devices has presented considerable technical difficulties. One major problem encountered with "Corstar" material is cracking of the ends during the sealing operation. The cracking becomes quite severe as the bore size of the "Corstar" tube increases. Expensive metal caps, made for example from niobium, have also been proposed for closing "Corstar" and polycrystalline alumina tubes, as described in British Patent Nos. 1,361,225 and 1,398,425. The present invention, however, provides an electrically conducting cermet which can successfully be used to close a "Corstar" tube. Such a material is the type using oxide particles in the range 400–800 microns and having a low volume fraction of metal down to 0.045. The technique is also directly applicable for closing polycrystalline alumina arc tubes, when the choice of cermet is less critical.

Figure 9A:
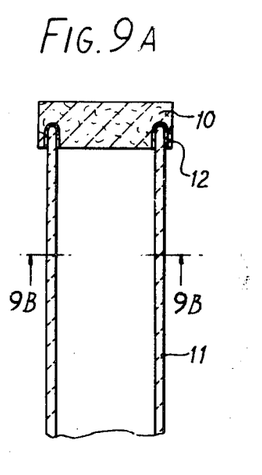
FIG. 9A is a side view and FIG. 9B an end view of a ceramic envelope positioned inside a grooved cermet cap.
Figures 9B, 10:
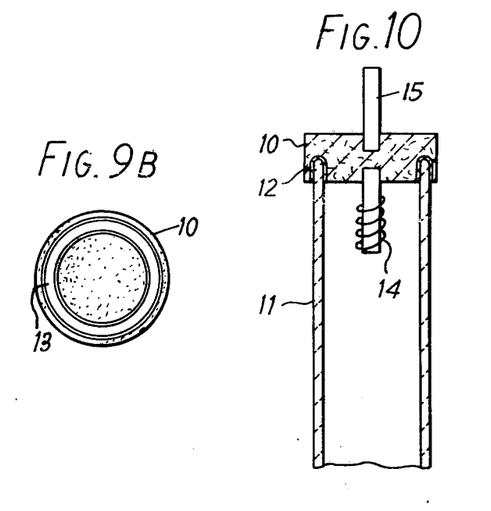
Figure 11:
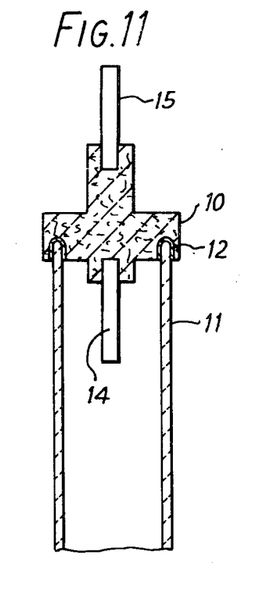
Figure 12A:
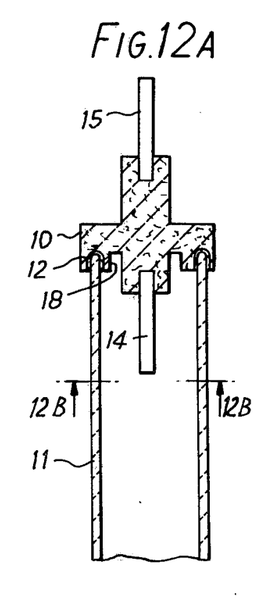
FIG. 12A is a side view and FIG. 12B an end view of a ceramic envelope positioned in a conducting cermet cap having two concentric grooves.
Figure 12B:
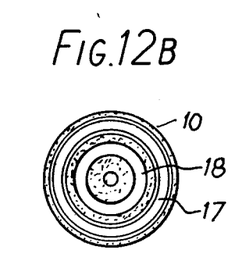

One simple method of using these materials for the construction of a high pressure sodium or metal halide lamp consists in making a cermet disc containing an annular groove, to act as a location for the arc tube, as shown in FIG. 9A. In the end view of the cermet cap shown in FIG. 9B, the unshaded area represents the circular groove. This method of closing the end of arc tubes has several advantages. The cap employed is of simple design, easy either to machine or to press. The circular groove is useful in locating the ends of the arc tube. Moreover, the leak path is increased since external surfaces as well as the area of cross-section of the tube are sealed. The seal design, besides being compact, is also extremely strong since compressive stresses are imposed on the ends of the ceramic envelope. In FIG. 9A, the grooved conducting cermet cap 10 is positioned in the "Corstar" or sintered polycrystalline alumina tube 11 and hermetically sealed with a conventional glass frit such as calcium-magnesium aluminate glass 12. The glass frit can be formed as a thin washer, presintered and placed inside the groove 13 (FIG. 9B) or premelted inside the annular groove to facilitate sealing. FIG. 10 shows two partly inserted tungsten or molybdenum rods 14 and 15 which are used as electrode and external electrical contacts respectively, the other numerals indicating similar parts as in FIGS. 9A and 9B. FIG. 11 shows another configuration of the grooved conducting cermet cap with a boss of reduced cross-sectional area to carry the electrode and the external electrical lead. This geometry, with a longer separation between the metal rods 14 and 15 has several interesting features as compared with the configuration shown in FIG. 9. First, it minimizes the risk of damage during drilling of the unfired cermet caps. Secondly, by increasing the separation between the metal rods 14 and 15, the resistivity of the cermet can be increased. This parameter can therefore be adjusted to provide sufficient heating to alter the cold spot temperature, particularly useful for example for low wattage high pressure sodium lamps. The external boss 16 with the reduced area of cross-section, being an integral part of the cap 10 can, moreover, be used for mechanical support of the lamp. FIGS. 12A and 12B show another configuration of the grooved conducting cermet with all the features shown in FIG. 11, but with two concentric grooves 17 and 18. This geometry has an added advantage of a more uniform stress distribution around the seal regions during lamp operation.

Figures 13, 17:
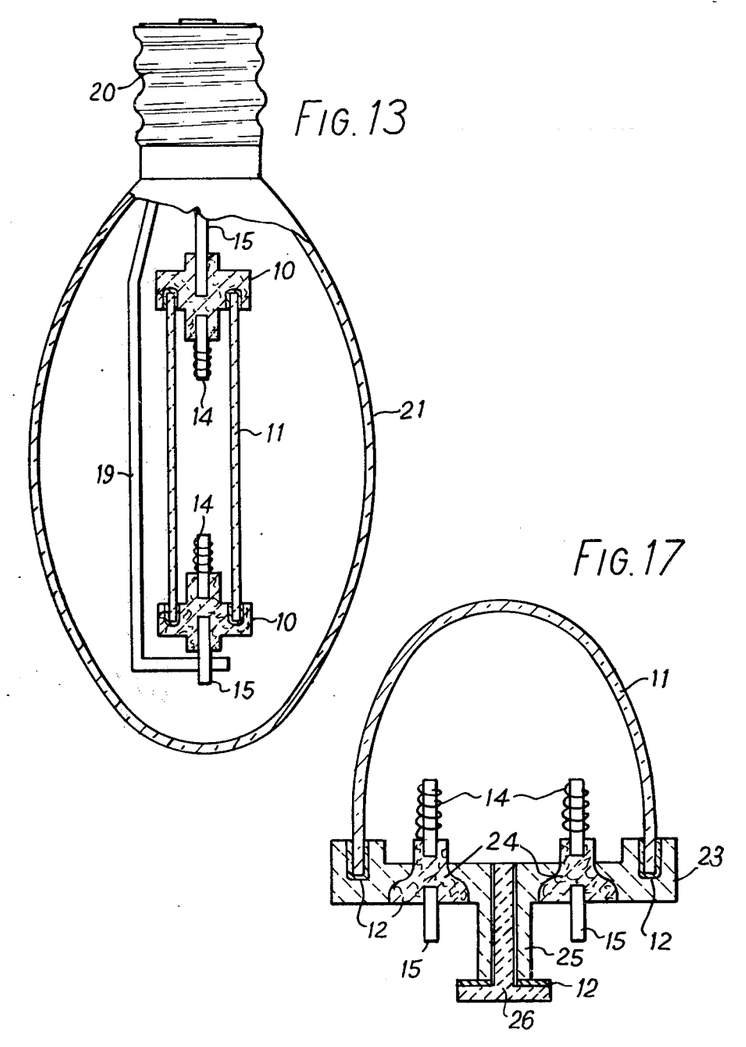
FIG. 13 shows one example of ceramic discharge lamp employing two grooved cermet caps.
FIGS. 14 to 18 are sectional views of composite end caps incorporating cermet zones in accordance with the invention.

FIG. 13 shows a complete assembly of one type of discharge lamp using grooved conducting cermet end caps. The arc tube 11, fitted with end caps and electrodes as already described, is supported by the rod 15a and a conductor 19 from a conventional base 20 within an outer transparent jacket 21.

COMPOSITE CAPS AND TUBES

The problem of mismatch in expansion coefficient between the metal electrode and the ceramic arc tube used in high pressure discharge lamps can be overcome in accordance with this aspect of the invention by fabricating an end component from two or more materials. The portion of the component bonded to the electrode is made from a cermet which is mechanically stronger and tougher than alumina and also has a thermal expansion coefficient which is more compatible with the electrode material than is alumina. The portion that seals to the arc tube is made from the same material as the arc tube or from a cermet with a thermal expansion coefficient closely matching that of the arc tube and of a composition that does not react chemically with the filling of the arc tube.

Graded expansion seals have been previously proposed but the fabrication of a single component having two or more portions made from different cermets or ceramics is believed to be novel and has opened up several new possibilities in lamp making, apart from the immediate purpose of sealing an electrode into an arc tube.

The extremely good flow characteristics and compacting behaviour of metallized oxide granules, as well as the excellent machinability of the compacted material have been exploited to fabricate intricate shapes.

Graded cermet parts with layered or cored configurations have been made by successive filling of a die with metallized alumina granules of increasing metal content and compacting at about 11,000 psi.

Figure 14:
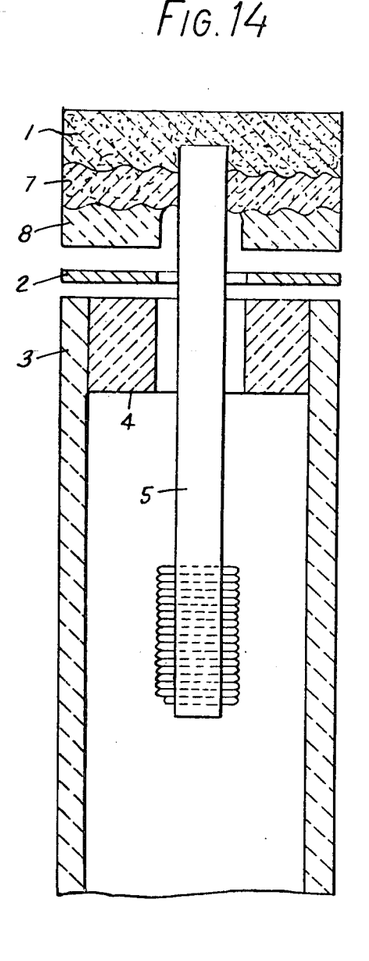

FIG. 14 shows a cap in the form of a graded, layered disc comprising a conducting cermet layer 1, an intermediate cermet layer 7 and an alumina layer 8, and containing a tungsten electrode 5. The advantage of this graded unit is that the alumina layer 8 can be sealed hermetically to an alumina plug 4 and alumina tube 3 using a conventional glass frit and furthermore the alumina layer does not have to be sealed to the tungsten electrode, thus avoiding the risk of cracking at this interface. The tungsten shank of the electrode 5 is gripped by the cermet layers 7,1 as described previously. The cermet 1 is an electrically conducting material to which connections can be made by any of the methods already described. This cermet is preferably constituted in accordance with the first aspect of this invention. The cermet 7 is a material intermediate in expansion coefficient between alumina 8 and the conducting cermet 1. More than one intermediate material can be used if required.

Figure 15:
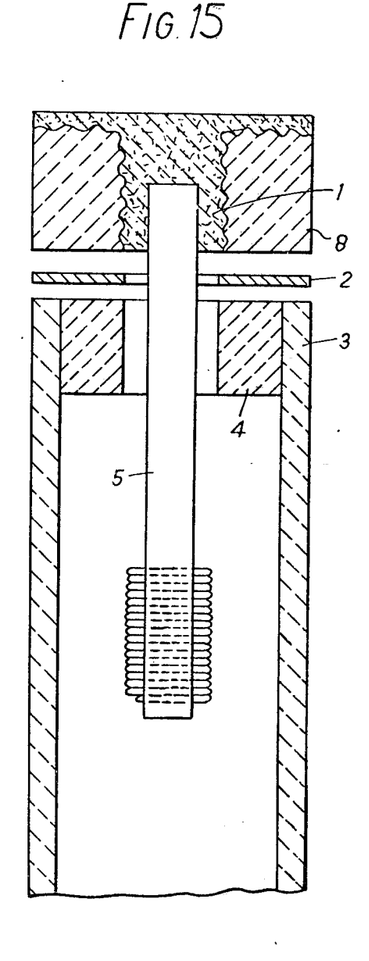
Figure 19:
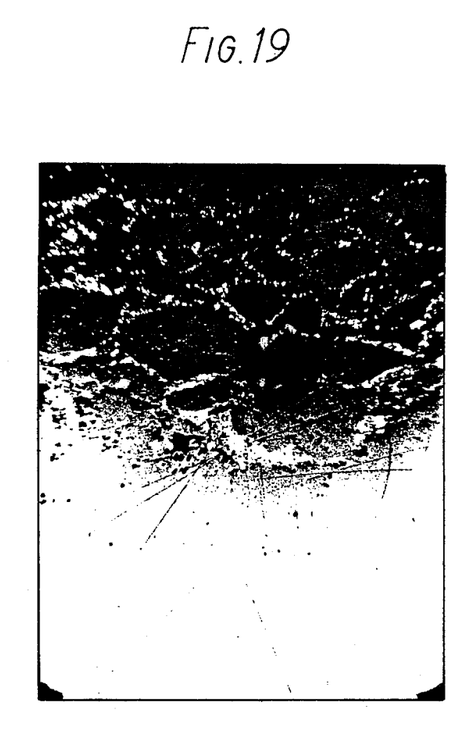
FIG. 19 is a photomicrograph ($\times 100$) of a monolithic sintered structure including layers of conducting cermet and ceramic.

FIG. 15 shows a cored structure in which material of the central core 1 is a conducting cermet and the surrounding material 8 is alumina or a cermet containing a lower volume fraction of metal than 1, since the expansion coefficient becomes closer to that of alumina as the metal content decreases. Because of the novel technique used in the preparation of conducting cermets according to the first aspect of this invention, which provides a low metal content distributed in a continuous three-dimensional network structure, a conducting cermet and alumina can be sintered together in a truly monolithic fashion to form a layered or cored struture without any intermediate cermet composition. FIG. 19 shows the section of such a layered structure, with a conducting alumina/tungsten cermet above (in which the metal appears as a bright network) and a conventional alumina ceramic in the lower part of the view.

The cap designs can be modified to provide a plurality of electrodes, for example by including an auxiliary starting electrode. Where more than one electrode is provided in the same cap the individual electrodes are separated by non-conducting material.

In certain applications it would be advantageous to make a discharge lamp in a ceramic arc tube capable of burning air (i.e., without an outer jacket). This is not possible with existing constructions because the external metal components in the cap/electrode assembly operate above their oxidation temperature.

Figure 16:
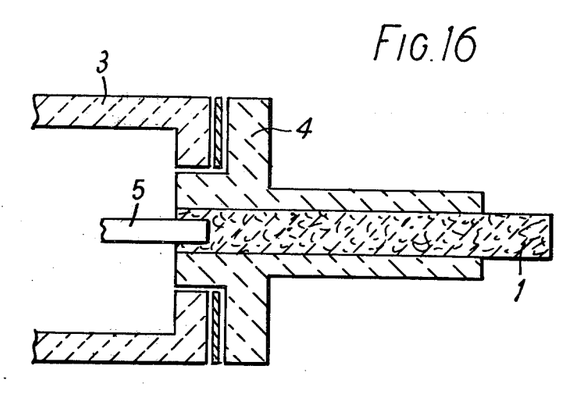

For such a tube a cap may be made in accordance with FIG. 16, comprising a ceramic body 4 containing a longitudinal coducting cermet core 1, which at its inner end carries the electrode 5 and at its outer end protrudes from the ceramic body. In effect the core is sheathed by the ceramic and is only exposed remotely from the lamp where its temperature is below the oxidation temperature of the metal contained in the conducting cermet. Contact can be made to this by any of the methods disclosed in the description above.

The invention also contemplates the use of a composite cermet cap to close the end of a single open and ceramic envelope which may be of either single crystal or polycrystalline alumina. FIG. 17 shows a cross-section of this embodiment of the invention which makes use of an insulating and a conducting cermet 23 and 24 respectively with virtually no difference in the coefficient of thermal expansion, as prepared with the help of the results shown in FIG. 3 and FIG. 4. For example, an insulating alumina-tungsten cermet can be made with alumina fines or granules of a size below 50 microns diameter and a conducting cermet with alumina granules between 400 and 500 microns in diameter but both containing the same weight % of tungsten powder. The ceramic envelope 11 is positioned with the groove and sealed with a conventional glass frit 12. An insulating cermet cap 23 may contain two stepped holes in which conducting cermet components 24 with partly embedded metal rods 14 and 15 can be inserted and sealed with the glass frit 12. Alternatively, a composite cap including an insulating body and conducting inserts can be sintered in one piece from the unfired condition. The device without an extension cermet tube is sufficient to construct a high pressure sodium lamp. However, by inserting a molybdenum, tungsten or cermet tube 25 in the cap, the device can be used for the construction of a metal halide lamp. An extension cermet tube in accordance with the present invention is made an integral part of the cermet cap 23 to facilitate the introduction of metal halide materials and closure of the device. The extension tube can be closed by inserting an alumina or conducting cermat plug 26 which is then sealed hermetically with glass frit 12. To avoid volatilisation of the volatile components during sealing, the glass frit is melted locally at the end of the cermet extension tube.

Whilst both the conducting cermets and the composite caps and tube are especially useful for high pressure discharge lamps using ceramic arc tubes, the invention is also applicable to any device in a ceramic tube, or envelope, for example incandescent or tungsten-halogen lamps.

In lamps requiring an accurately focussed filament, for example in motor vehicles, film projectors or hand torches, it is usual to attach some form of cap and flange to the finished lamp and locate the filament with respect to a reference plane on the flange, before fixing the flange to the cap or the cap to the lamp. This is a so-called prefocussed construction.

Figure 18:
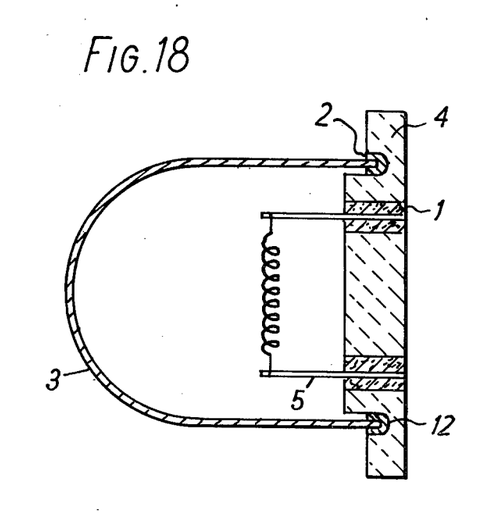

In accordance with our invention and as shown in FIG. 18 a combined cap and locating flange 4 is made from a non-conducting cermet or ceramic, but containing islands of conducting cermet. The lead-in wires 5 are positioned in the conducting cermet islands before the article is sintered. After sintering, a filament or filaments 11 are accurately located with respect to the reference plane an fixed to the leadwires. A light-transmitting envelope 3 is then placed over the cap assembly, preferably into an annular location groove 12, and either directly fused to the base or sealed via an intermediate material, such as glass 2. The lamp is then exhausted and filled with gas in the usual way through an exhaust tube attached to the envelope or base (not shown). Electrical contact can be made directly onto the external surfaces of the conducting cermet islands 1; or by one of the alternative techniques described for discharge lamps. This simplifies the manufacture of prefocussed lamps and is applicable to any single or multifilament design, either with or without prefocussing facilities.

In an alternative construction, the lead-wires as such can be omitted and extended filament legs directly inserted into the conducting cermet islands, before sintering. If desired, the legs may be strengthened by threading them into coiled tungsten spirals—a technique already known in the manufacture of certain tungsten-halogen lamps.

Although the invention has been described for the case of discharge tubes with electrodes which do not pass right through the caps, these materials and constructions can sometimes be used to advantage with electrode leads which do pass through the cap. For example, the superior mechanical strength of a cermet in accordance with the invention may be useful, even though the electrical conductivity property is not used.

Figure 20:
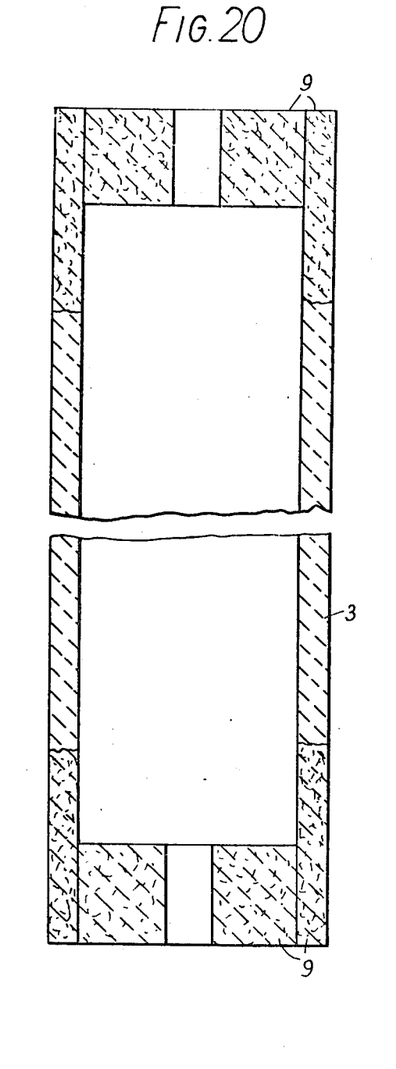
FIGS. 20 and 21 are a diagrammatic section and perspective view of two composite arc tubes in accordance with the invention.
Figure 21:
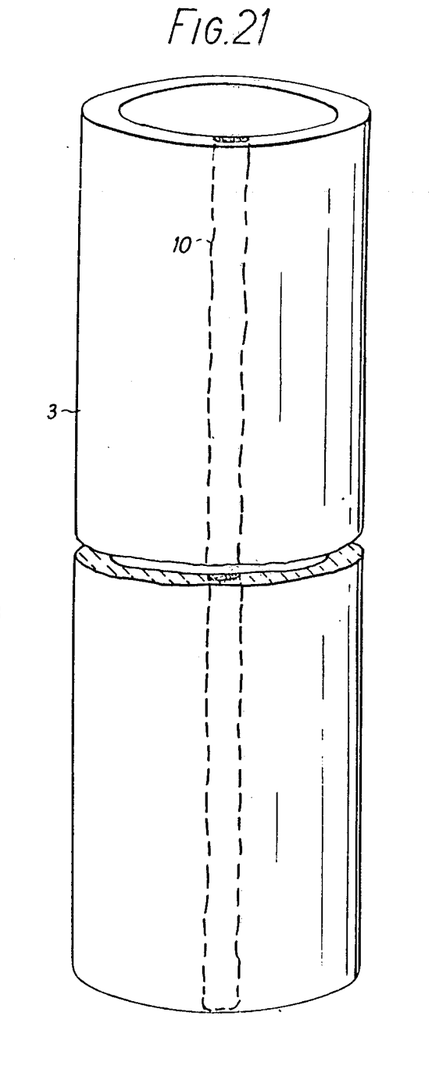

The application of layered structures of cermets and ceramics can be further extended to produce composite tubes as seen in FIGS. 20 and 21. For example, FIG. 20 shows an alumina arc tube 3 with cermet ends 9 which act as heat shields and enable the cool spot temperature of the arc to be controlled. FIG. 21 shows an alumina tube 3 incorporating an internal longitudinal cermet stripe 10 which can be used as a lamp starting aid.

Other Applications

The insulating and conducting cermets according to this invention can be used in forming a variety of structures other than end caps for discharge lamps. For example, the insulating cermet can be used to support tungsten filaments against sagging, bridge lead wires, for example of tungsten or molybdenum, and carry chemically compatible getter materials in gas filled lamps or tungsten halogen lamps. This is possible because the cermet can be sintered on several tungsten or molybdenum wires or rods simultaneously without cracking.

Leadwires and electrodes other than of tungsten may be used provided they are sufficiently refractory to withstand the furnacing temperature. The preferred furnace atmosphere is hydrogen but it could be a vacuum, or in certain circumstances a non-reactive gas.

The cermets of this invention can also be joined to various glasses of matching thermal expansion, for example borosilicate glasses, with or without an intermediate glass frit seal.

We claim:

1. A cermet comprising refractory oxide granules having a mean diameter of about 800 microns or less and being formed as agglomerates of refractory oxide particles having diameters less than said mean diameter, said granules being surrounded by a thin layer of a B group metal of Group 4B to 7B or a metal of Group 8 of the Periodic System said layer comprising particles of said metal having mean particle diameters which are substantially less than those of said granules, said layer constituting a conducting network extending through said cermet and the volume fraction of said metal in said cermet being between 0.045 and 0.067.

2. A cermet according to claim 1 wherein the refractory oxide comprises alumina and the metal comprises tungsten or molybdenum.

3. A cermet according to claim 1 formed integrally with an electrically insulating cermet comprising the same oxide and metal and having the same volume fraction of metal.

4. A cermet according to claim 1 in the form of an end cap for an electric lamp.

5. A cermet according to claim 3 in the form of an end cap for an electric lamp, said conducting cermet constituting conducting regions of said cap extending through insulating regions constituted by said insulating cermet.

6. A method of making a cermet having thermal expansion characteristics closely matching those of an insulating ceramic or cermet comprising a refractory oxide, said method comprising the steps of:
providing refractory oxide granules having a mean particle size not exceeding 800 microns;
providing a metal powder having particles sufficiently fine to form a coating on said granules;
rolling said granules in said powder with a volume fraction of said metal of 0.045 to 0.067 to form a coating of said metal on said granules;
compacting the coated granules to form a coherent body;
and sintering said body to form a cermet.

7. A method according to claim 6 wherein said oxide particles have a mean particle size in the range 400 to 800 microns and said cermet is electrically conducting.

8. A method according to claim 6 wherein said oxide particles are below 100 microns and said cermet is electrically insulating.

9. A method according to claim 6 including the steps of:
rolling particles of said refractory oxide having a mean particle size less than 100 microns in said metal powder with a volume fraction of said metal similar to that employed with said particles of 400 to 800 microns;
compacting a body of such rolled particles with said body of coated granules to form a composite body;
and sintering said composite body to form a composite cermet body having conducting and insulating regions of similar volume fractions of metal.

10. A method according to claim 6 wherein said coated particles are compacted under a pressure of 10,000 to 20,000 p.s.i. and sintered at a temperature of 1600° to 1800° C.

11. A cermet made by the method of claim 6.

12. A cermet according to claim 1 wherein the mean diameter of the oxide granules is from 400 to 800 microns and the diameters of the oxide particles are about 50 microns or less.

* * * * *